(12) United States Patent
Crutcher et al.

(10) Patent No.: US 7,237,259 B2
(45) Date of Patent: Jun. 26, 2007

(54) FAULT REDUCING FIREWALL SYSTEM

(75) Inventors: Paul Monroe Crutcher, Rochester, MN (US); Paul Maurice Gunsch, Rochester, MN (US); Todd Douglas Inman, Rochester, MN (US); William Russell Marshall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 10/289,942

(22) Filed: Nov. 7, 2002

(65) Prior Publication Data
US 2004/0093511 A1 May 13, 2004

(51) Int. Cl.
*G06F 15/16* (2006.01)
*G06F 17/00* (2006.01)
*G06F 9/00* (2006.01)

(52) U.S. Cl. ............... 726/11; 713/153; 709/224; 726/2

(58) Field of Classification Search ........... 726/2, 726/11; 713/153
See application file for complete search history.

(56) References Cited

U.S. PATENT DOCUMENTS

| | | | | | |
|---|---|---|---|---|---|
| 5,912,889 | A | * | 6/1999 | Preas et al. ............... | 370/359 |
| 6,236,659 | B1 | * | 5/2001 | Pascoe ...................... | 370/404 |
| 6,674,720 | B1 | * | 1/2004 | Passint et al. ............. | 370/235 |
| 2003/0028806 | A1 | * | 2/2003 | Govindarajan et al. ..... | 713/201 |

* cited by examiner

*Primary Examiner*—Gilberto Barron, Jr.
*Assistant Examiner*—Samson Lemma
(74) *Attorney, Agent, or Firm*—Steven W. Roth

(57) ABSTRACT

Disclosed are two mechanisms for preventing access failures attributable to dynamic port assignment of firewall-blocked ports. The mechanism involves an enhanced firewall that opens blocked ports prior to possible dynamic allocation so that the blocked ports are not available when a port is requested. The second mechanism involves an enhanced commutations stack that works in conjunction with an enhanced firewall to reserve blocked ports so that the blocked ports are not available for dynamic allocation when a port is requested.

4 Claims, 5 Drawing Sheets

FAULT REDUCING FIREWALL SYSTEM

FIELD OF THE INVENTION

The present invention relates to network firewalls, and in particular, to the reduction of faults attributable to firewall systems.

BACKGROUND OF THE INVENTION

The deployment of the EDVAC computer system is seen by many as the beginning of the "computer age." Up until the mid 1990s, computer system usage increased gradually over the years. More recently, the widespread use of the Internet has caused a dramatic increase in the use and popularity of computer systems. This popularity has not come without problems, however. For example, when an individual makes a purchase "over the Internet," the transaction must be secure to prevent unauthorized use of the individual's credit. Another example is the need for data and resource security. By data and resource security, we mean securing computer systems against unauthorized access (e.g., viruses, worms, etc.). This patent pertains to this latter security issue.

A firewall is a popular mechanism used to prevent unauthorized access to computer system resources. The firewall, which is typically implemented in software, is set up to guard against unauthorized access. The firewall accomplishes this task by preventing programs from accessing computer system resources through specific channels or paths that connect the computer system to an untrusted network (e.g., the Internet). These channels or paths are referred to as communications ports, or more commonly, as just ports (borrowing from nautical term). These specific ports are known to the firewall because they have been used in the past by those seeking unauthorized access. We refer to these specific ports within this patent as blocked ports.

Thus, when a firewall detects that access is being attempted via a blocked port, it simply denies access, causing the attempt to fail. While this approach works well from a security perspective, it has the negative effect of periodically blocking valid access attempts. Generally speaking, this problem is attributable to the fact that communications software (often called the communications stack) does not have knowledge of the ports considered blocked by the firewall. The problem is exacerbated by the dynamic nature in which ports are assigned to requesting programs by the communications stack. For example, an external program attempting to access a computer system's resources may be given a non-blocked port on first access attempt, a blocked port on a second access attempt, and a non-blocked port on a third access attempt. The first and third access attempts will be allowed to proceed by the firewall, but the second access attempt will be blocked. In the industry, this type of problem is called an intermittent failure. Failures of this sort are very difficult and costly to correct because they are difficult to reproduce.

It is evident, then, that a need exists for an improved system for preventing intermittent failures associated with firewall port access denials.

SUMMARY OF THE INVENTION

The present invention involves an apparatus, method, and program product for preventing access failures attributable to dynamic port assignment of firewall-blocked ports. Two approaches for preventing these failures are disclosed. The first approach involves an enhanced firewall mechanism that reserves blocked ports prior to possible dynamic allocation so that the blocked ports are not available when a port is requested. The second approach involves an enhanced communications stack that accepts reservation of blocked ports so that the blocked ports are not available for dynamic allocation when a port is requested.

DESCRIPTION OF THE PREFERRED EMBODIMENT

Figure 1A:
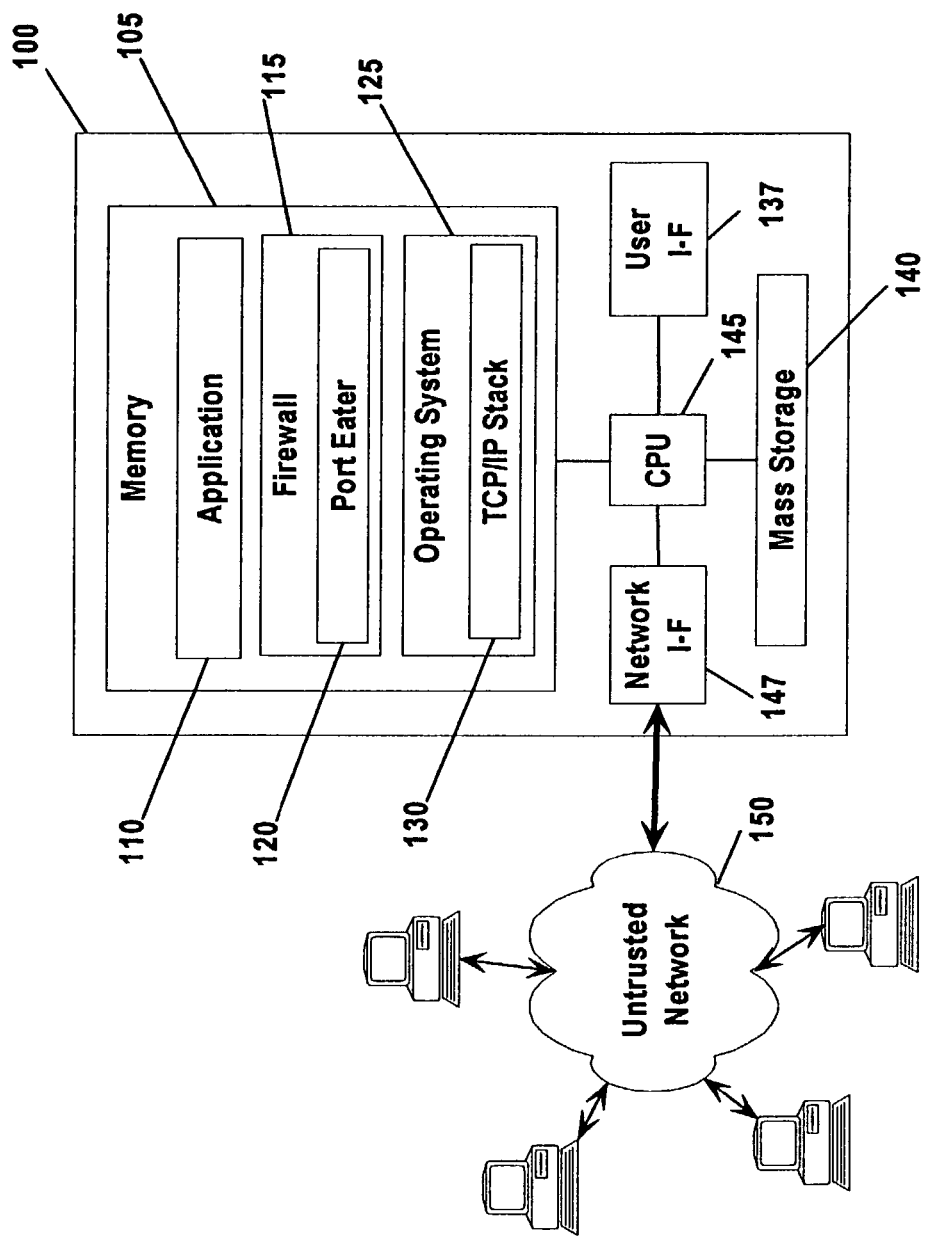
FIG. 1A is a block diagram showing the computer system environment used in the preferred embodiment of the present invention.

Turning now to the drawings, FIG. 1A shows some of the operational components used in the computer system of the preferred embodiment of the present invention. Computer system 100 is an enhanced IBM computer system, although other, similarly configured computer systems could be used. Depicted components include central processing unit (CPU) 145, network interface 147, user interface 137, mass storage 140, and memory 105. CPU 145 is used to execute the programs stored in memory 105, although it should be understood that at certain times these programs may partially or completely reside in mass storage 140. Network interface 147 is used to communicate with computer systems residing on untrusted network 150. In the preferred embodiment, untrusted network 150 is the Internet, but other untrusted networks would be equally applicable. User interface 137 is used to accept commands and relay information to the one or more users of computer system 100.

Operating system 125 contains TCP/IP stack 130. TCP/IP stack 130 is used to communicate with computer systems on Untrusted Network 150. In the preferred embodiment, Firewall 115 has been enhanced to include Port Eater 120, which is described in the text associated with FIG. 2. Application 10 is an example application program that may be used to communicate with other programs that are stored on the computer systems of Untrusted Network 150. In practice, though, the components of the preferred and alternate embodiments carry out the same general function, and would not, therefore, be simultaneously installed on the same computer system.

Figure 1B:
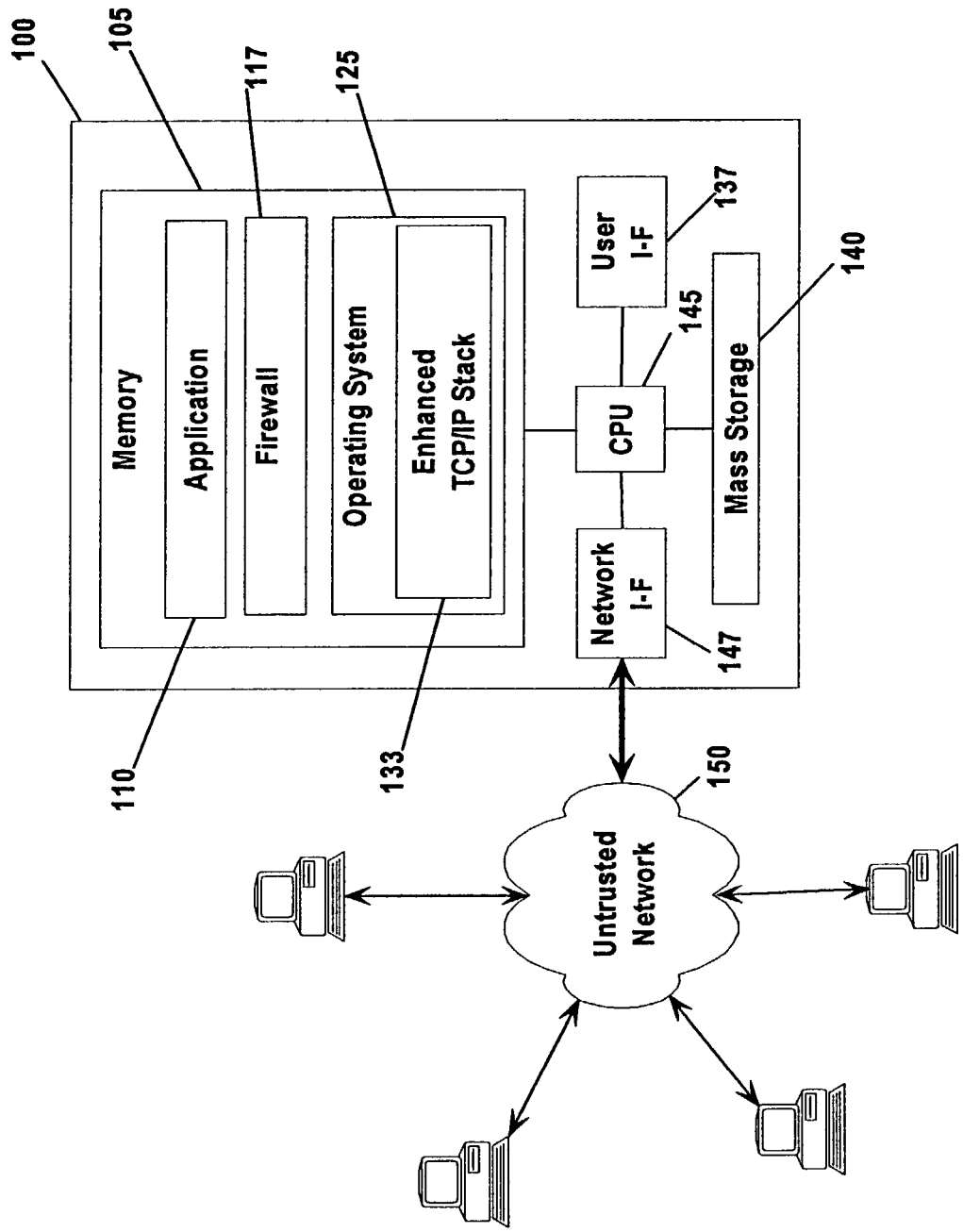
FIG. 1B is a block diagram showing the computer system environment used in an alternate embodiment of the present invention.

FIG. 1B shows some of the operational components used in the computer system of an alternate embodiment of the present invention. In the alternate embodiment, the Firewall (now Firewall 117) does not include Port Eater 120, but has instead been enhanced to register blocked ports with enhanced TCP/IP stack 133. These aspects of Firewall 117 and enhanced TCP/IP stack 133 are described in the text associated with FIG. 3.

Figure 1C:
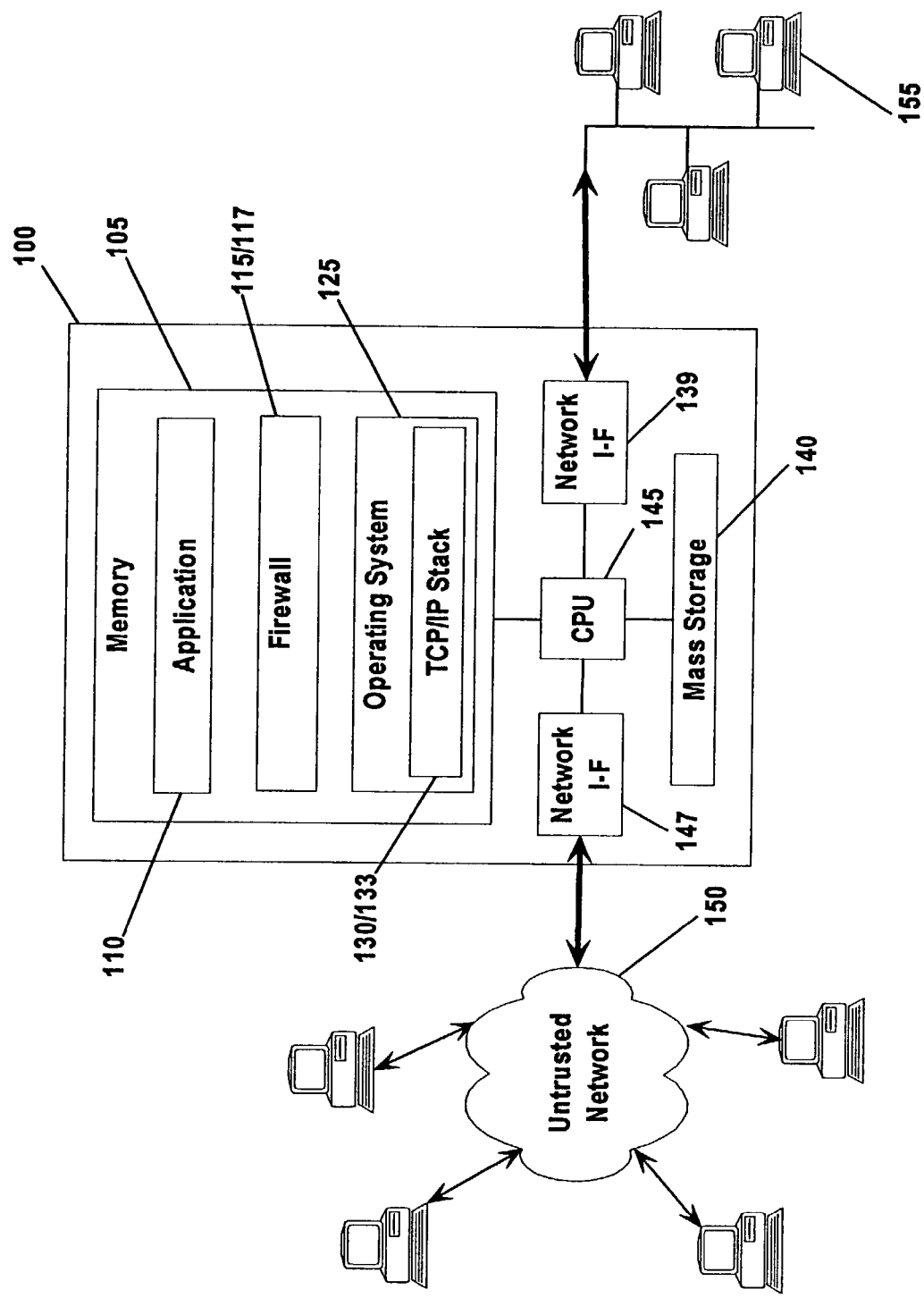
FIG. 1C is a block diagram showing an alternate computer system environment that could be used in the preferred and alternate embodiments of the present invention.

FIG. 1C shows an alternate environment in which the preferred and alternate embodiments could be used. The systems of FIGS. 1A and 1B involve a single computer system that protects itself through the use of a "personal" firewall. However, as shown on FIG. 1C, the mechanisms of the preferred and alternate embodiments could be used on a network server so as to protect client computers (e.g., internal network 155) from unauthorized access. For example, consider Network interface 139, which is used to communicate with internal network 155. This type of configuration is often used in larger institutions such as hospitals, banks, and large businesses.

As a preliminary matter, it should be understood that while the embodiments of the present invention are being described herein in the context of a complete system, certain program mechanisms, such as Firewall 115 and TCP/IP stack 130, are capable of being distributed in program product form. Of course, a program product can be distributed on different types of signal bearing media, including, but not limited to: recordable-type media such as floppy disks and CD ROMs; and transmission-type media such as digital and analog communications links.

Figure 2:
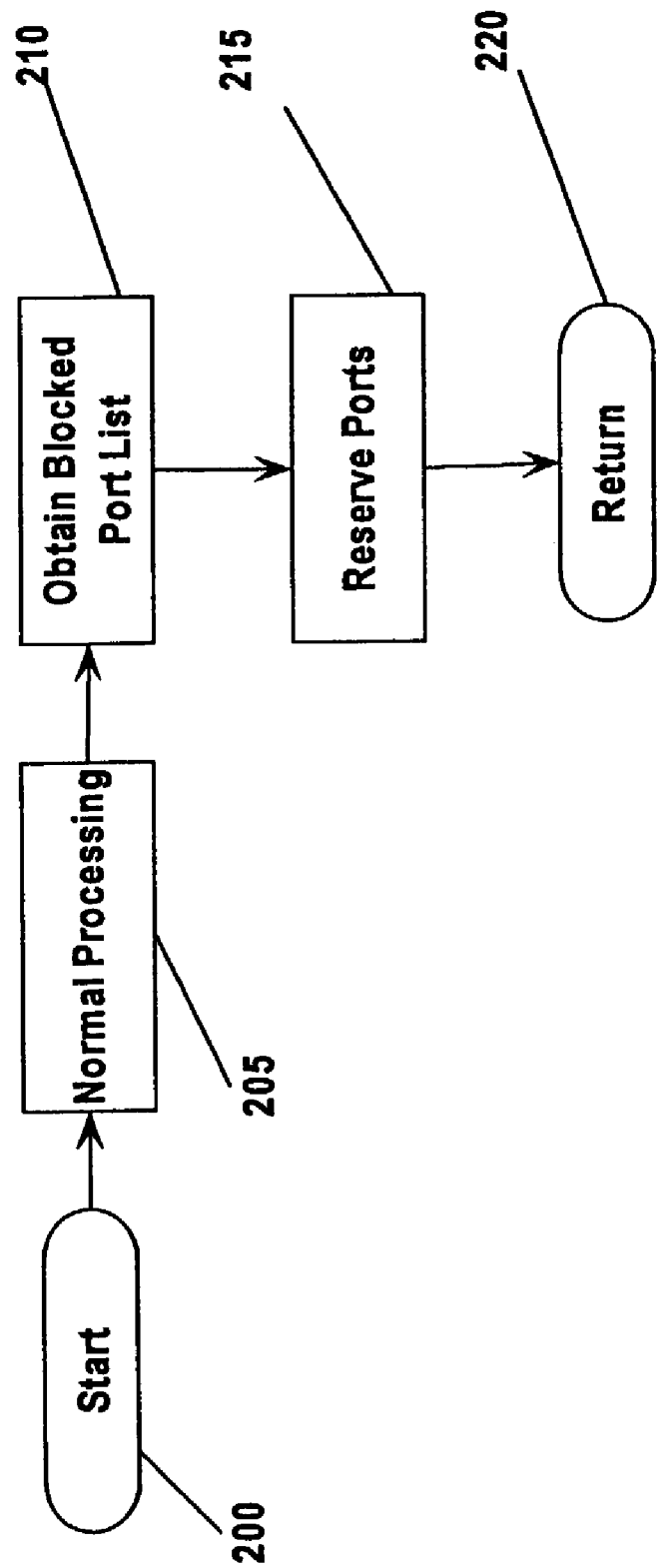
FIG. 2 is a flow diagram showing the steps used to carry out the processing of the port eater of the preferred embodiment.

FIG. 2 is a flow diagram showing the steps used to carry out the processing of the port eater of the preferred embodiment. Port Eater 120 begins its processing as part of the normal start-up processing of Firewall 115 [blocks 200 and 205]. Port Eater 120 then obtains its list of blocked ports from its configuration files [block 210]. (The way in which the Blocked Port List is stored and retrieved is not important to the description of the preferred embodiment, and accordingly, is not described here.) In the preferred embodiment, the Blocked Port List is really a composite list, containing both TCP ports and UDP ports. After obtaining the Blocked Port list, Port Eater 120 proceeds to reserve the associated ports [block 215]. In the preferred embodiment, this is accomplished using the following pseudo code, although other approaches could be used. It should also be noted that additional logic for handling blocked access attempts could be added.

```
#include <sys/socket.h> /* needed to use sockets */
struct sockaddr_in nsaddr;
struct sockaddr_in from_addr;
int from_len;
        /* specify Internet-type connection */
        nsaddr.sin_family = AF_INET;
            /* accept connections from any address */
        nsaddr.sin_addr.s_addr = INADDR_ANY;
        While TCP ports in blocked ports list
        {
            /* create the socket */
        int vs = socket(AF_INET, SOCK_STREAM, 0);
            nsaddr.port = (port from list)
            /* bind the socket to the port specified above */
        bind(vs, (struct sockaddr *)&nsaddr, sizeof(nsaddr));
        }
        While UDP ports in blocked ports list
        {
            /* create the socket */
```

-continued

```
        int vs = socket(AF_INET, SOCK_DGRAM, 0);
            nsaddr.port = (port from list)
            /* bind the socket to the port specified above */
        bind(vs, (struct sockaddr *)&nsaddr, sizeof(nsaddr));
        }
}
```

Once the ports have been reserved, Port Eater 120 returns control to Firewall 115 [block 220]. When an application program, such as application program 110, requests a port for the purposes of accepting an inbound connection, TCP/IP stack 130 proceeds to assign a non-reserved port to the requesting application because Port Eater 120 will have already reserved all of the ports on its Blocked Port List.

Figure 3:
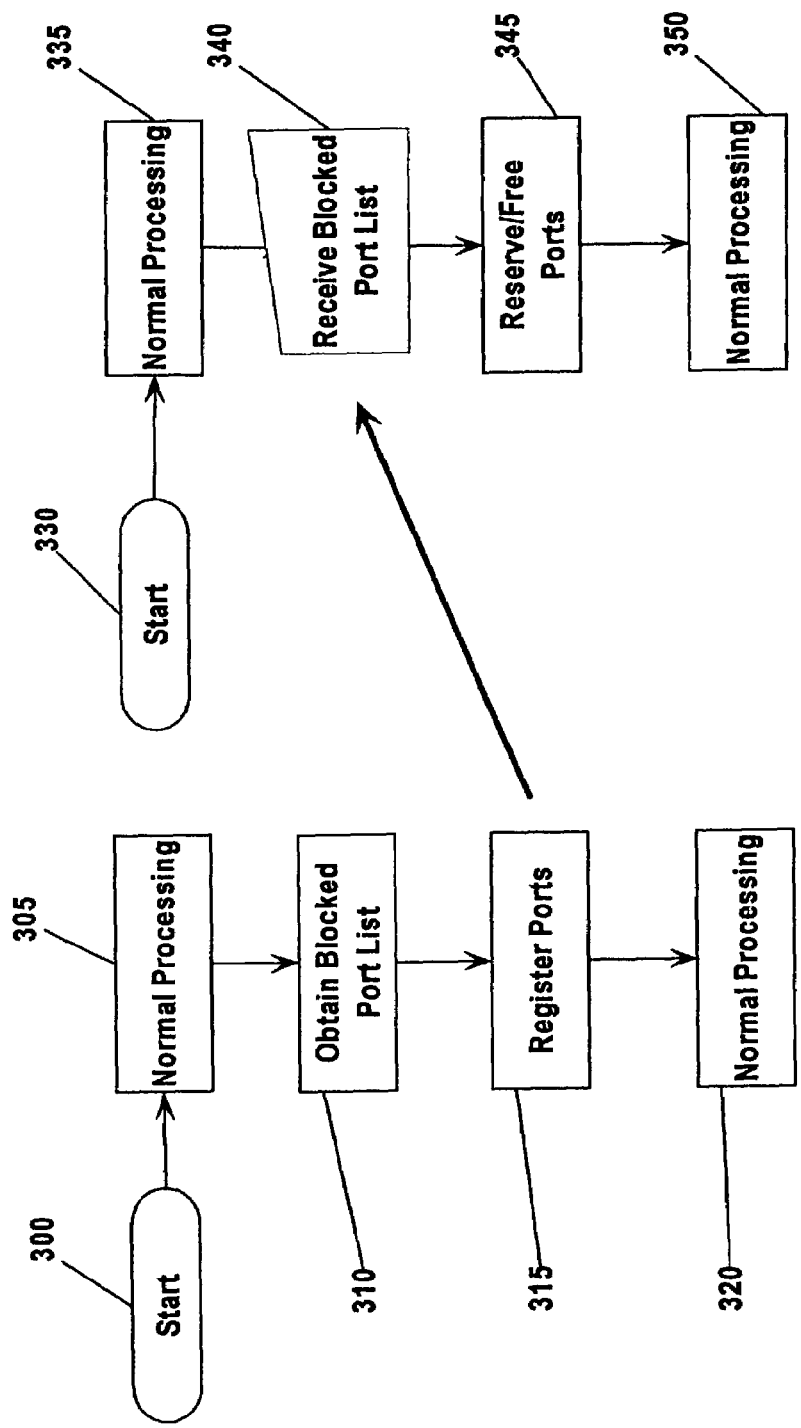
FIG. 3 is a flow diagram showing the steps used to carry out the processing of the enhanced TCP/IP stack of an alternate embodiment of the present invention and the steps used to carry out the processing of an enhanced firewall of an alternate embodiment of the present invention.

FIG. 3 is a flow diagram showing the steps used in an alternate embodiment of the present invention to carry out enhanced processing of TCP/IP stack 133 and Firewall 117. Blocks 300–320 represent processing steps of enhanced Firewall 117, whereas blocks 330–350 represent processing steps of enhanced TCP/IP stack 133. In blocks 300 and 305, Firewall 117 engages in its normal start-up processing. In block 310, Firewall 117 obtains its Blocked Port List. Then, in block 315, Firewall 117 registers the ports on its Blocked Port list with TCP/IP stack 133. This registration is accomplished using an interface provided by TCP/IP stack 133. After registering the ports on the Blocked Port list, Firewall 117 continues with its normal processing [block 320].

Once the Blocked Port list is received by TCP/IP stack 133 in block 340, TCP/IP stack 133 reserves the ports in the list, and frees any ports that were previously reserved, but that do not appear in the current list [block 345]. TCP/IP stack 133 then proceeds with normal processing in block 350. It should be noted that the ports on the Blocked Port List may change during processing, meaning that the logic shown in FIG. 3 needs to be executed whenever the Blocked Port List is changed.

When an application program, such as application program 110, requests a port for the purposes of accepting an inbound connection, TCP/IP stack 133 proceeds to assign a non-reserved port to the requesting application.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method, said method comprising the steps of:
    identifying a communications port that is not to be used for communications; and
    preventing said communications port from being dynamically allocated for use in communications, wherein said preventing step is accomplished through use of a firewall and wherein said preventing step comprises registering said communications port with a communications stack which thereby causes said communications stack to pre-allocate said communications port prior to when said communications port could be dynamically allocated.

2. The method of claim 1 wherein said preventing step further comprises the step of:

reserving said communication port prior to when said communications port could be dynamically allocated.

3. The method of claim 2 wherein said steps are performed by a firewall.

4. A program product, said program product comprising:

a recordable-type computer-readable media; and a program stored on said recordable-type computer-readable media, said program being configured to perform the following steps:

identifying a communications port that is not to be used for communications; and preventing said communications port from being dynamically allocated for use in communications, wherein said preventing step is accomplished through use of a firewall and wherein said preventing step comprises registering said communications port with a communications stack which thereby causes said communications stack to pre-allocate said communications port prior to when said communications port could be dynamically allocated.

* * * * *